July 22, 1958
D. T. BLATHERWICK
2,844,082
LENS MOUNTING
Filed Oct. 29, 1953
2 Sheets-Sheet 1
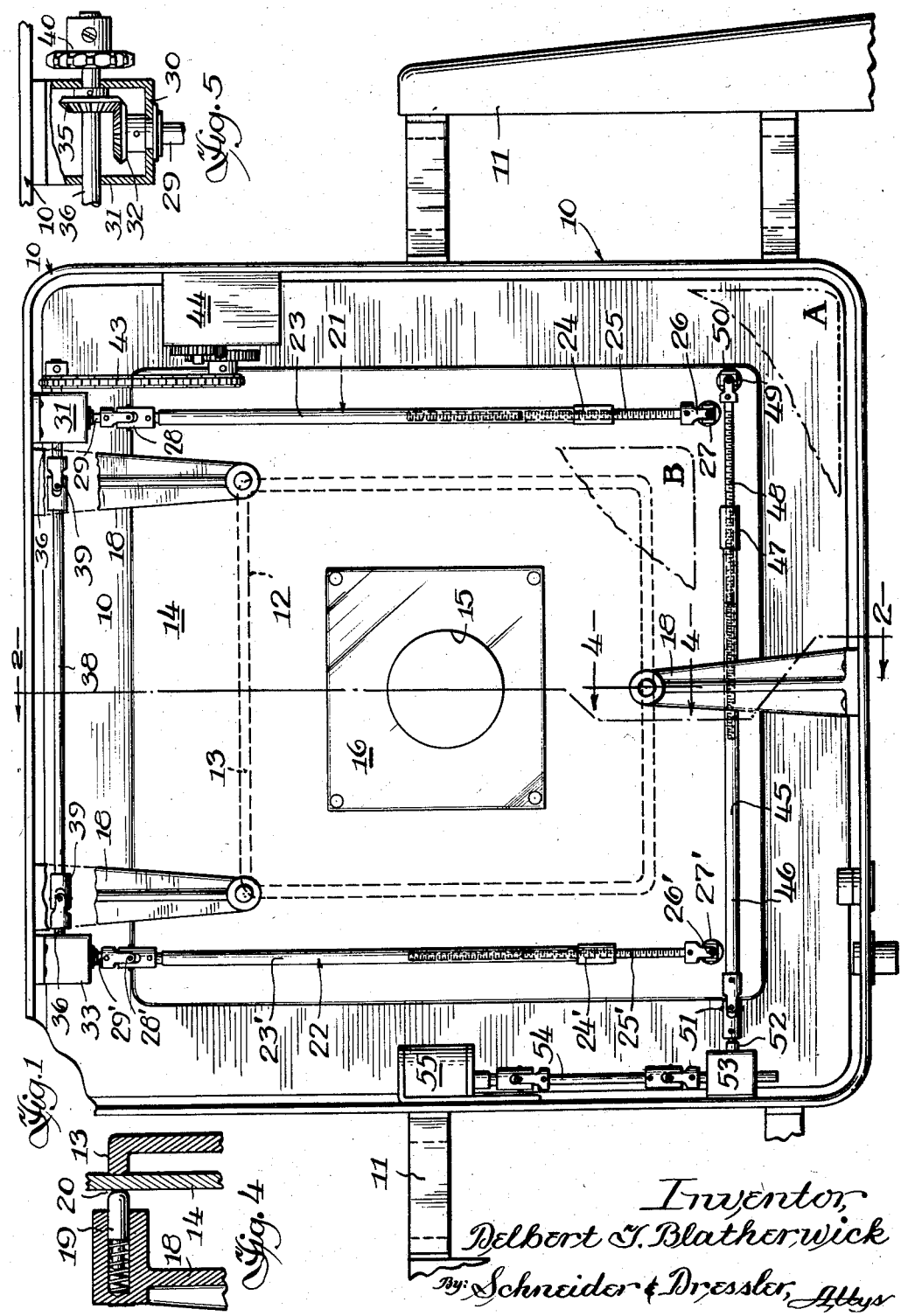
Inventor,
Delbert T. Blatherwick
By: Schneider & Dressler, Attys

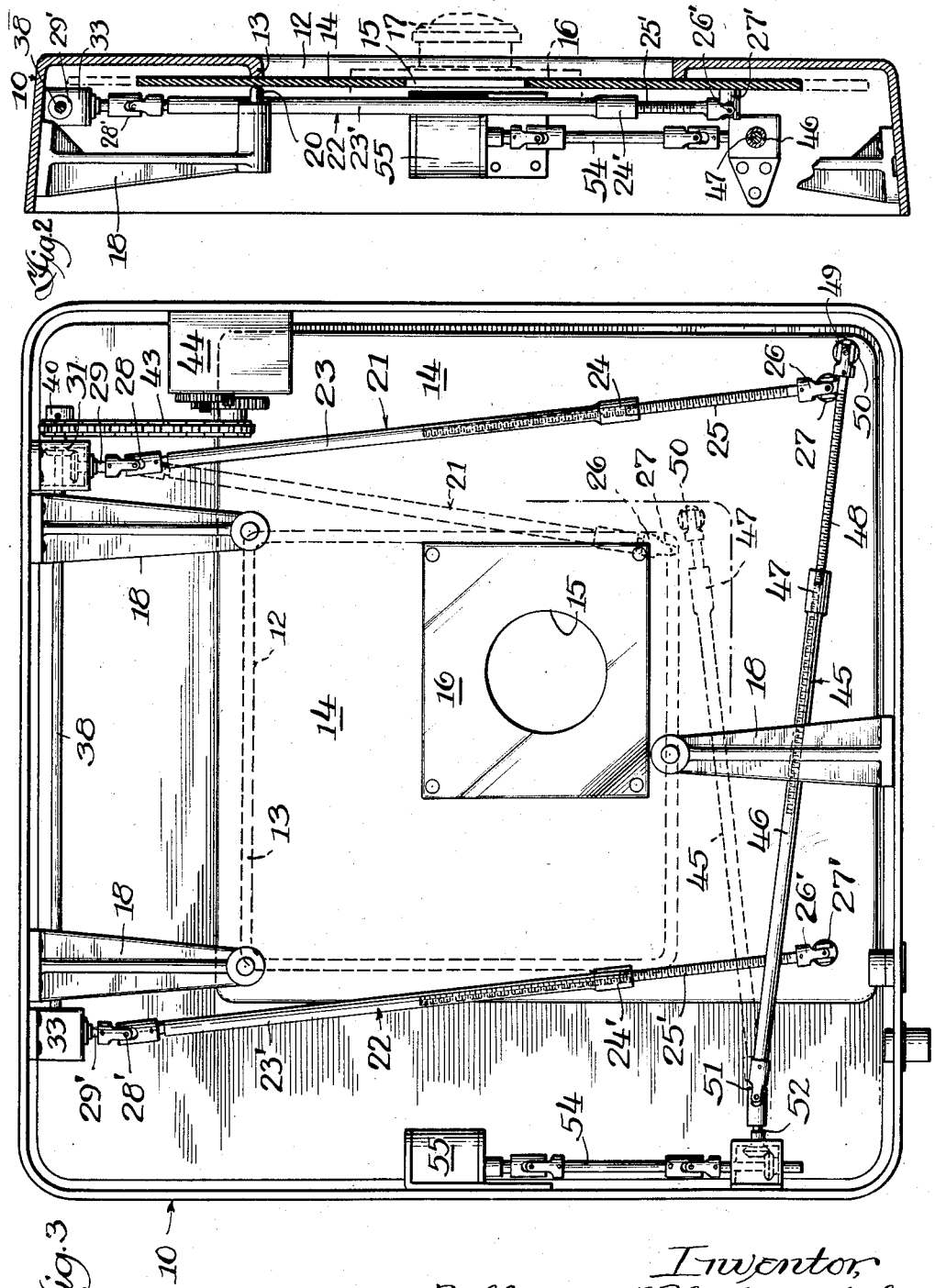

United States Patent Office 2,844,082
Patented July 22, 1958

2,844,082
LENS MOUNTING

Delbert T. Blatherwick, Chicago, Ill., assignor to Robertson Photo-Mechanix, Inc., a corporation of Illinois Application October 29, 1953, Serial No. 389,103

8 Claims. (Cl. 95—51)

The present invention relates to improvements in lens board mountings, more particularly in connection with process cameras and similar cameras in which a high degree of accuracy in operation is required.

In the operation of process cameras it is frequently desirable or necessary to move the lens vertically or horizontally to bring it into a desired position, preferably by remote control. In order to secure the necessary refinement and precision of operation in such cameras, it is necessary that at all times in such movement the axis of the lens be maintained in parallelism to its original position and at the same time that there be no alteration of the plane parallel to the axis in which the lens is moved. Hitherto, it has been customary to mount the lens in a system of slides, generally one horizontal and the other vertical. In such mountings it has been both difficult and expensive to secure the necessary degree of precision and refinement in the construction and the mountings of the slides. In accordance with the present invention, these requirements are fully met by a simple and accurate construction in which any desired vertical or horizontal movement of the lens may be effected, if desired, by remote control.

The invention will be fully understood from the following description, illustrated by the accompanying drawings, in which—

Fig. 1 is a rear elevation of the lens board and mounting therefor;

Fig. 2 is a sectional view on the line 2—2 of Fig. 1;

Fig. 3 is a rear elevation of parts of the lens board and mounting shown in Fig. 1, Fig. 2 showing the parts after movement to a different position from that shown in Fig. 1;

Fig. 4 is a fragmentary detail sectional view through the line 4—4 of Fig. 1; and Fig. 5 is a fragmentary detail sectional view of a gear box forming part of the suspension of the lens board mounting plate.

Referring to the drawings, the numeral 10 indicates the lens board housing, which takes the form of a frame, open at the rear, and in which the lens board and its supporting means are mounted. Lens board mounting frame 10 is secured to the camera base by means of supports 11, or preferably to a carriage on the camera base (not shown), which is movable backward and forward on the base in the usual manner.

The frame 10 forming the lens board housing has a large approximately square central opening 12, and around this opening is provided with a rearwardly turned shoulder or flange 13, as shown in Fig. 2. The rear surface of this shoulder is carefully machined to a plane surface, which is slidably contacted by and forms a bearing surface for the lens board mounting plate 14 in which is a central opening 15. The lens board 16 carrying a lens 17 is screwed or otherwise removably attached to the lens board plate 14 with the lens in alignment with the opening 15.

The lens board mounting plate 14, which may be moved vertically or horizontally as hereinafter described, is at all times maintained in contact with the contact surface of the shoulder 13 of the mounting frame 10. This is effected by providing means for applying pressure to the plate 14 at all times during its movement and in any position in which it may be desired to position the plate and the lens carried by it. For this purpose, three or more brackets 18 are mounted within the frame 10, each carrying a spring pressed pin 19 which slidably contacts and is forced against the rear surface of the lens board mounting plate 14. The outwardly projecting surfaces 20 of the pins 19 are preferably somewhat rounded, as shown in Fig. 4, to reduce the friction between them and the mounting plate 14 during movement of the latter. By suitable arrangement of the brackets 18 and the spring pressed pins 19, the pressure exerted against the plate to keep it in contact with the shoulder 13 may be equalized, so that the front surface of the plate 14 may be maintained at all times in the proper plane. A suitable arrangement for this purpose is shown in the drawings, in which the brackets 18 carrying the spring pressed pins 19 are arranged so that lines connecting the points of contact of these pins with the plate 14 would form a triangle, with two above and one below the center of the plate. Obviously other arrangements may be employed; for example, with three pressure points as illustrated, there could be one above and two below the center of the plate, or one at either side with two at the other side; or a larger number of pressure points could be provided. Furthermore, the shoulder or contact surface 13 may be broken, or may be provided only at positions of the periphery of opening 12 sufficient to form adequate contact surfaces for plate 14 at all positions of its movement as hereinafter described; such contact surfaces being all in a common plane.

In order to support the plate in any desired position and to impart vertical movement to it, the plate is suspended on two rods, indicated generally by the numerals 21 and 22, on opposite sides of the plate 14. As hereinafter described, these rods are longitudinally extensible, telescoping rods which may be lengthened or shortened at the will of the operator, to vary the vertical position of the plate 14. Since the construction and arrangement of these two rods are the same, only one will be described in detail.

Thus the rod 21, as illustrated, is made up of a long cylindrical sleeve 23 terminating in a somewhat enlarged internally threaded portion 24. Within the sleeve 23 is provided the externally threaded stem 25, which is pivotally secured at 26 to a pin 27 mounted on the plate 14 near its lower edge. The stem 25 does not rotate. The sleeve 23 is connected by universal joint 28 to a short shaft 29, which is journaled in the base plate 30 of a small gear box 31. A miter gear 32 is mounted on the shaft 29 and is rotated as hereinafter described. As will be apparent, on rotation of the gear 32 and the shaft 29, the sleeve 23 is rotated and the stem 25 is screwed into or out of the sleeve 23, thus shortening or lengthening the rod 21. The rod 22 is constructed and mounted in a similar manner, parts thereof being given the same numbers as the corresponding parts of the rod 21 with a prime. The shaft 29' which is connected to the sleeve 23' of rod 22 is rotated by a miter gear (not shown) identical with gear 32 and mounted in the gear box 33. The gear boxes 31 and 33 are mounted in the lens board housing 10 in alignment at its upper edge.

To effect the rotation of the gear 32 and the corresponding gear in gear box 33, there is provided in each gear box a cooperating miter gear 35 mounted on a shaft 36 journaled in the side walls of the corresponding gear box 31 or 33. The shafts 36 in the two gear boxes, while in substantial alignment, are connected together by intermediate shaft section 38 and the universal joints 39. A suitable drive means is provided for the shafts 36 in the gear boxes 31 and 33. Thus a sprocket wheel 40 may be secured to an end of one of the shafts 36 which projects beyond the gear box 31, and the sprocket wheel may be driven by sprocket chain 43 from the small reversible motor 44, likewise mounted in the lens board housing 10. It will thus be apparent that when the motor 44 is operated, the shafts 36 are simultaneously rotated causing simultaneous operation of the rods 21 and 22 to raise or lower the lens board mounting plate 14, depending upon the direction of rotation of the motor 44. The pins 27 and 27' on the plate 14 with which the rods 21 and 22 are connected are aligned in substantial parallelism to the upper and lower edges of the lens board mounting plate 14. The rods 21 and 22 thus carry the plate 14 and by reason of their connection through universal joints 28 and 28' to the gear shafts 29 and 29', the plate 14 may be moved laterally without affecting the operation of the rods 21 and 22 in raising and lowering the plate 14.

To effect lateral movement of the plate 14, a rod, generally designated by the numeral 45, is provided. This rod is also a longitudinally extensible, telescoping rod, like the rods 21 and 22, and may be lengthened or shortened at the will of the operator, to vary the lateral position of plate 14. It is made up of a sleeve portion 46 having at one end an enlarged internally threaded portion 47 which engages an externally threaded stem 48 which enters the sleeve 46. The stem 48 is pivotally connected at 49 to a pin 50 which is attached to a lower corner of the plate 14. The sleeve 46 is connected by universal joint 51 to a gear shaft 52 journaled in one side of the gear box 53. The gear box 53 contains a pair of miter gears (not shown) similar to those in the gear boxes 31 and 33 previously described. The gear set in the box 53 is driven through the shaft 54, provided with universal joints at each end, from the small reversible motor 55. The gear box 53 and the motor 55 are likewise mounted in the lens board housing 10, preferably at one side thereof. On rotation of the motor 55, the movement is transmitted through shaft 54 and the gear set in gear box 53 to the rod 46. The latter is shortened or lengthened, depending upon the direction of rotation of the motor 55, the lens board mounting plate 14 thereby being moved laterally in one direction or the other.

It is thus apparent that by the mounting of the lens board mounting plate 14 as above described, it may be moved vertically or horizontally through a substantial distance. In Fig. 1, extreme positions of the lower right hand corner of plate 14 are indicated in broken lines at A and B. In Fig. 3, the plate is shown in full lines in an extreme position of lateral and vertical movement, with the suspension rods 21 and 22 and the rod 46 lengthened to their full extent. In this same figure, there is also shown in broken lines the positions of certain of the same parts in another extreme position with the suspension rods 21 and 22 and the rod 46 shortened to the greatest possible extent. Since the movement of the rods 21 and 22 is always identical, the positions assumed by the mounting plate 14 are always in parallelism. By the action of the spring pressed pins 19, the mounting plate 14 is always held in close contact with the shoulder 13 irrepsective of its position and is thus always maintained in the same plane.

As will be readily apparent, the controls for the reversible motors 44 and 53 which effect the movement of the plate 14 may be placed at any convenient location; for example, in proximity to the copyholder or to the plate holder of the camera, or if desired, duplicate controls may be placed at each point. It is also apparent that the control shafts for the suspension rods 21 and 22 and for the rod 46 may be operated manually if so desired. By the device illustrated, the lens mounted on the lens board mounting plate 14 may be moved to any desired position over a wide range of movement without disturbing its actual alignment with respect to the plane of the copy or of the plate or film.

Although the present invention has been described in connection with the specific details of an example embodying the same, it is not intended that these details shall be regarded as limitations upon the scope of the invention, except insofar as set forth in the accompanying claims.

I claim:

1. In a lens board mounting system, a supporting frame having an opening, said frame being provided around said opening with contact surfaces in a common plane, a lens board mounting plate slidably engaging said surfaces, a lens board mounted on said plate, said lens board and said plate having openings aligned with each other and with the opening in said frame in all positions of said plate, whereby a lens may be secured to said lens board in alignment with all three of said openings, spring pressed means forcing said plate into engagement with said contact surfaces, suspension rods pivotally attached at one end to said plate and pivotally attached at the other end within said supporting frame, thereby supporting said plate, and means for imparting substantially lateral movement to said plate within the confines of said frame.

2. In a lens board mounting system, a supporting frame having an opening, said frame being provided around said opening with contact surfaces in a common plane, a lens board mounting plate slidably engaging said surfaces, a lens board mounted on said plate, said lens board and said plate having openings aligned with each other and with the opening in said frame in all positions of said plate, whereby a lens may be secured to said lens board in alignment with all three of said openings, spring pressed means forcing said plate into engagement with said contact surfaces, parallel suspension rods pivotally attached at one end to said plate and pivotally attached at the other end within said supporting frame, whereby said suspension rods support said plate and are maintained in parallelism, and means for imparting substantially lateral movement to said plate within the confines of said frame.

3. In a lens board mounting system, a supporting frame having an opening, said frame being provided around said opening with contact surfaces in a common plane, a lens board mounting plate slidably contacting said surfaces, a lens board mounted on said plate, said lens board and said plate having openings aligned with each other and with the opening in said frame in all positions of said plate, whereby a lens may be secured to said lens board in alignment with all three of said openings, spring pressed means slidably engaging said plate and forcing it into engagement with said contact surfaces, parallel extensible suspension rods pivotally attached at one end to said plate and pivotally attached at the other end within said supporting frame, thereby supporting said plate, means for varying the length of said suspension rods, thereby imparting substantially vertical movement to said plate within the confines of said frame, and independent means for imparting substantially lateral movement to said plate within the confines of said frame.

4. In a lens board mounting system, a supporting frame having an opening, said frame having shoulder portions around said opening forming contact surfaces in a common plane, a lens board mounting plate slidably contacting said surfaces, a lens board mounted on said plate, said lens board and said plate having openings aligned with each other and with the opening in said frame in all positions of said plate, whereby a lens may be secured to said lens board in alignment with all three of said openings, spring pressed means slidably engaging said plate and forcing it into engagement with said contact surfaces, parallel extensible suspension rods pivotally attached at one end to said plate and pivotally at the other end within said supporting frame above said plate, thereby supporting said plate, means for varying the length of said suspension rods, thereby imparting substantially vertical movement to said plate within the confines of said frame, an extensible rod attached pivotally at one end to said plate and attached pivotally at the other end within said supporting frame laterally of said plate, and means for varying the length of said last mentioned rod to impart substantially lateral movement to said plate within the confines of said frame.

5. The lens board mounting system of claim 4 wherein each of the suspension rods comprises a sleeve member having an internally threaded portion, an externally threaded stem member entering said sleeve portion and means for rotating one of said members to vary the length of said suspension rod.

6. The lens board mounting system of claim 4 wherein each of the suspension rods comprises a sleeve member having an internally threaded portion, an externally threaded stem member entering said sleeve portion and means for simultaneously rotating one of said members of each of said rods, thereby simultaneously varying the length of said rods.

7. The lens board mounting system of claim 4 wherein the rod for imparting substantially lateral movement to said plate comprises a sleeve member having an internally threaded portion, an externally threaded stem member, and means for rotating one of said members to vary the length of said rod.

8. In a lens board mounting system, a supporting frame having an opening, said frame having shoulder portions around said opening forming contact surfaces in a common plane, a lens board mounting plate slidably contacting said surfaces, spring pressed means slidably engaging said plate and forcing it into engagement with said contact surfaces, parallel extensible telescoping suspension rods, each of said rods having a sleeve member provided with an internally threaded portion and an externally threaded stem member engaging therewith, the stem member of each of said rods being pivotally attached to the plate and the sleeve member being connected through a universal joint to a rotatable shaft mounted in said frame above said plate, means for simultaneously rotating said shafts, thereby rotating the sleeve members of said rods and varying the length thereof to impart vertical movement to said plate, a transverse longitudinally extensible rod having a sleeve member with an internally threaded portion and an externally threaded stem member engaging therewith, the stem member being pivotally attached to said plate and the sleeve member being attached through a universal joint to a rotatable shaft mounted in said frame laterally of said plate, and means for rotating said shaft to vary the length of said rod and impart transverse movement to said plate.

References Cited in the file of this patent

UNITED STATES PATENTS

| | | |
|---|---|---|
| 661,956 | Davis | Nov. 20, 1900 |
| 973,020 | Fisk | Oct. 18, 1910 |
| 1,535,225 | Hays et al. | Apr. 28, 1925 |
| 1,626,591 | Ames | May 3, 1927 |
| 1,883,798 | King | Oct. 18, 1932 |
| 2,077,490 | Paris | Apr. 20 1937 |
| 2,158,039 | Wenczler | May 9, 1939 |